United States Patent [19]

Tsuchiya et al.

[11] 4,183,050
[45] Jan. 8, 1980

[54] CLAMPING CIRCUIT FOR COLOR TELEVISION SIGNALS

[75] Inventors: Takao Tsuchiya, Fujisawa; Shouji Omori, Tachikawa; Yasunobu Kuniyoshi, Tokyo; Atsushi Matsuzaki, Yokohama; Susumu Akazawa, Ichikawa; Kiyonori Tominaga, Tokyo, all of Japan

[73] Assignee: Sony Corporation, Tokyo, Japan

[21] Appl. No.: 919,706

[22] Filed: Jun. 27, 1978

[30] Foreign Application Priority Data

Jun. 29, 1977 [JP] Japan .................................. 52/77497
Jun. 30, 1977 [JP] Japan .................................. 52/78136

[51] Int. Cl.$^2$ .................................................. H04N 9/535
[52] U.S. Cl. .................................................. 358/34; 358/30
[58] Field of Search .................................. 358/34, 30

Primary Examiner—George G. Stellar
Attorney, Agent, or Firm—Lewis H. Eslinger; Alvin Sinderbrand

[57] ABSTRACT

A clamping circuit for color television signals includes a demodulator for demodulating the chrominance component of the color television signals to produce first and second color difference signals, and first and second adders for adding adjustable first and second control signals to the first and second color difference signals so as to produce modified first and second color difference signals. A matrix circuit is responsive to the outputs from the first and second adders to produce a third color difference signal. A reference signal, which represents a predetermined level of a color television signal, such as the pedestal level, is added to each of the color difference signals; and a first comparator compares the first color difference signal, with the reference signal added thereto, to the third color difference signal, with the reference signal added thereto, and a second comparator compares the second color difference signal, with the reference signal added thereto, to the third color difference signal, with the reference signal added thereto. At the times of occurrence of the pedestal level of the color television signal, the outputs from the first and second comparators are sampled, respectively, to produce the first and second control signals which are fed back and added to the first and second color difference signals.

In one embodiment, the reference signal is a d.c. level proportional to the pedestal level of the color television signal. In another embodiment, the reference signal is the luminance component of the color television signal clamped to the pedestal level. This clamped luminance signal is produced by another clamp circuit.

7 Claims, 4 Drawing Figures

CLAMPING CIRCUIT FOR COLOR TELEVISION SIGNALS

BACKGROUND OF THE INVENTION

This invention relates to a clamping circuit for color television signals and, more particularly, to an improved clamping circuit which clamps the red, green and blue color signals to the pedestal level, which improved circuit is far less complicated and less expensive than clamping circuits heretofore known.

A conventional color television signal, such as the NTSC signal, is formed of successive line intervals of video information, each line interval including a horizontal synchronizing pulse, a burst signal, a luminance component and a chrominance component. Typically, the horizontal synchronizing pulse is a negative-going pulse which is referenced to a pedestal level. This pedestal level also provides a reference level upon which the burst signal is superimposed. Also, in order to determine the luminance and chrominance information, the levels of the luminance and chrominance components generally are referenced to the pedestal level. Thus, it is appreciated that, in order to properly demodulate a color television signal and to display an accurate video picture, it is necessary that the pedestal level of the received color television signal be detected correctly. However, during the transmission of a color television signal, the pedestal level thereof, which may be considered a d.c. reference level, often fluctuates from its proper level. Accordingly, in a conventional television receiver, a clamp circuit must be provided to detect such fluctuations in the pedestal level and to correct or compensate for such fluctuations, thereby clamping the color television signal to the proper pedestal level from which the various horizontal synchronizing pulses, burst signals, luminance component and chrominance component can be measured and detected.

Since the luminance and chrominance components of a composite color television signal are processed by separate channels in a color television receiver, it is quite likely that the pedestal level of the chrominance component may vary in a manner which differs from the variations in the pedestal level of the luminance component. Therefore, it is desirable to provide a clamp circuit in the chrominance channel so that the chrominance component can be clamped correctly to its proper pedestal level. This clamp circuit is formed of three separate and independent clamping circuits which are used for the red, green and blue color difference signals, respectively. Each clamping circuit includes a comparator for comparing a respective color difference signal to a reference level, such as the desired pedestal level, and any difference therebetween is sampled at the time of occurrence of the pedestal level in the color television signal. This difference between the actual and desired pedestal levels is stored and added to the color difference signal so as to adjust its pedestal level to be equal to the desired pedestal level. However, since three separate and independent clamping circuits must be used to clamp the red, green and blue color difference signals, this arrangement is relatively complex and expensive.

In another proposal of a clamp circuit for use in the chrominance channel of a color television receiver, the complexity of the circuit is reduced by simplifying the clamping circuit which is used in conjunction with the green color difference signal. In this proposal, the red and blue color difference signals are provided with separate clamping circuits, as before. A matrix circuit is connected to receive the clamped red and blue color difference signals and to produce the green color difference signal therefrom. It is assumed that, since the red and blue color difference signals are clamped to the proper pedestal level, then the green color difference signal which is derived therefrom, that is, which is produced by the matrix circuit, likewise will be clamped to the proper pedestal level, thus obviating the need for the comparator and sampling circuit which previously had been used with the green color difference signal. However, a typical matrix circuit is a resistor matrix. As is known, the resistance values of a resistor matrix generally are within allowable tolerances and, moreover, may drift over a period of time. This means that the pedestal level of the green color difference signal may not be equal to the proper pedestal level even though the red and blue color difference signals are properly clamped. As a consequence thereof, when the green color difference signal is combined, or matrixed, with the luminance component, the green drive signal which is obtained will have a fluctuating pedestal level.

OBJECTS OF THE INVENTION

Therefore, it is an object of the present invention to provide an improved clamp circuit for color television signals which is less complicated and less expensive than clamp circuits which have been used heretofore.

Another object of this invention is to provide an improved clamp circuit for use in the chrominance channel of a color television receiver wherein red, green and blue color difference signals, as well as red, green and blue color drive signals, are properly clamped to the correct pedestal level.

A further object of this invention is to provide an improved clamp circuit for color television signals wherein two of the color difference signals are derived from the chrominance demodulating circuitry, these two color difference signals being clamped to the proper pedestal level, and these clamped color difference signals being matrixed to produce the third color difference signal whose pedestal level is compared to the clamped pedestal levels of the two color difference signals for effecting adjustments in the clamped pedestal levels.

Various other objects, advantages and features of the present invention will become readily apparent from the ensuing detailed description, and the novel features will be particularly pointed out in the appended claims.

SUMMARY OF THE INVENTION

In accordance with the present invention, a clamp circuit for color television signals is provided with first and second adders to add adjustable first and second control signals, respectively, to first and second demodulated color difference signals so as to produce modified first and second color difference signals. The modified color difference signals are matrixed to produce a third color difference signal; and a reference signal, which represents a predetermined level, such as the pedestal level, of a color television signal, is added to each of the modified color difference signals, and also to the third color difference signal. The modified first color difference signal with the reference signal added thereto is compared to the third color difference signal with the reference signal added thereto. Any difference therebetween is sampled during the time of occurrence of the pedestal level of the color television signal, and this sampled difference is fed back to the first adder and used as the first control signal for adjusting the pedestal level of the first color difference signal. Similarly, the modified second color difference signal with the reference signal added thereto is compared to the third color difference signal with the reference signal added thereto. Any difference therebetween is sampled during the time of occurrence of the pedestal level of the color television signal, and this sampled difference is fed back to the second adder and is used as the second control signal to adjust the pedestal level of the second color difference signal.

In one embodiment, the reference signal is a d.c. level proportional to the pedestal level of the color television signal. In another embodiment, the reference signal is the luminance component of the color television signal clamped to the pedestal level. Thus, in this latter embodiment, when the sampling circuits are operated, the reference signal is equal to the clamped pedestal level of the luminance component.

BRIEF DESCRIPTION OF THE DRAWINGS

The following detailed description, given by way of example, will best be understood in conjunction with the accompanying drawings in which.

DETAILED DESCRIPTION OF CERTAIN PREFERRED EMBODIMENTS

Figure 1:
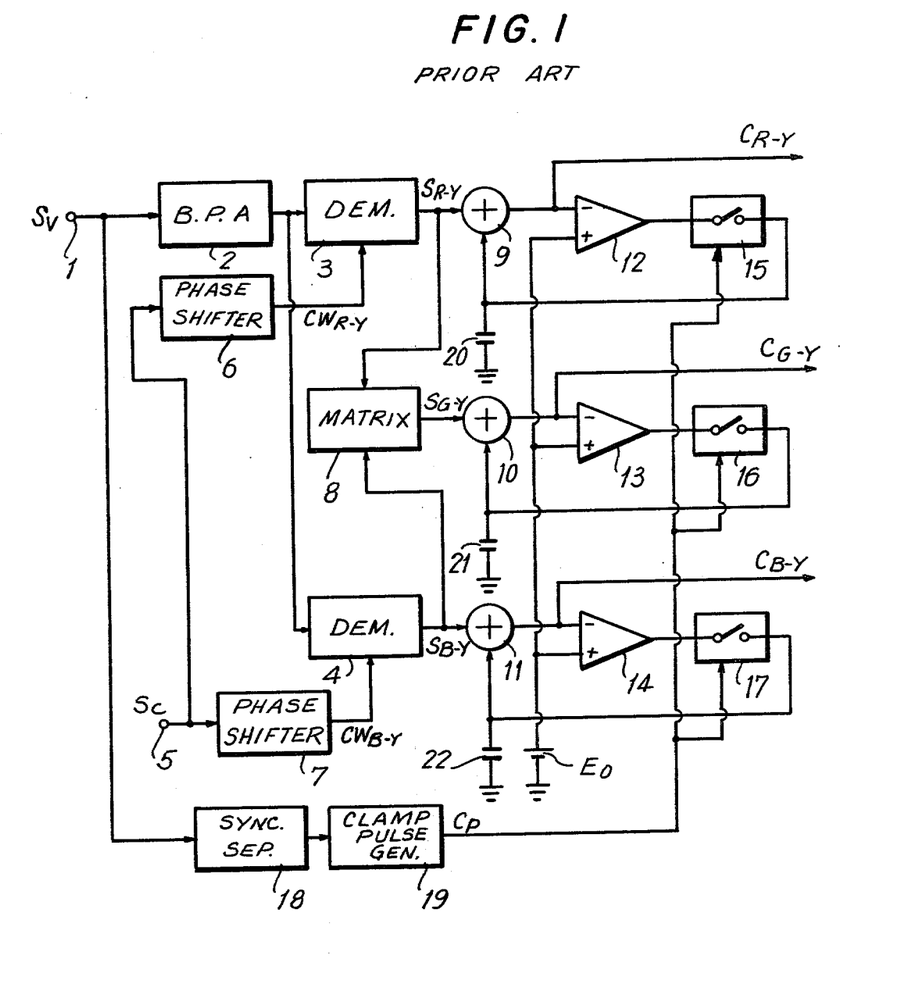
FIG. 1 is a block diagram of a clamp circuit proposed by the prior art.

Referring now to the drawings, wherein like reference numerals are used throughout, and in particular to FIG. 1, there is illustrated a block diagram of a clamp circuit which has been proposed heretofore. It is believed that the clamp circuit of the present invention will best be appreciated by first referring to this previously proposed circuit. The apparatus shown in FIG. 1 is included in the chrominance channel of a color television receiver, and is comprised of demodulators 3 and 4, adders 9, 10 and 11, comparators 12, 13 and 14, sampling circuits 15, 16 and 17, clamp pulse generator 19 and storage capacitors 20, 21 and 22. Demodulators 3 and 4 are conventional synchronous demodulators which are used to demodulate the chrominance component of a color television signal into its respective red and blue color difference signals. Accordingly, the inputs of demodulators 3 and 4 are connected in common and are coupled to an input terminal 1 by a band pass amplifier 2. Input terminal 1 is adapted to receive a composite color television signal $S_V$ and, as is known, band pass amplifier 2 has a limited frequency band for transmitting only the chrominance component therethrough. Another input of demodulator 3 is connected to receive a locally generated subcarrier $S_c$, applied to input terminal 5 by a local oscillator (not shown), and supplied to demodulator 3 by a phase shifter 6. Similarly, another input of demodulator 4 is connected to input terminal 5 by a phase shifter 7. The outputs of demodulators 3 and 4 are connected to a matrix 8 which, for example, may be a conventional resistor matrix which combines the red and blue color difference signals in proper proportions to produce the green color difference signal.

Adders 9, 10 and 11 are coupled to demodulator 3, matrix 8 and demodulator 4, respectively, for receiving the red, green and blue color difference signals. An adjustment signal is also connected to each of these adders for the purpose of adjusting the pedestal level of the respective color difference signals in the event that such pedestal level varies or drifts from the desired level. These adjustment signals are provided by capacitors 20, 21 and 22, respectively.

Comparators 12, 13 and 14 are adapted to compare the respective color difference signals to a reference signal $E_o$, the reference signal being representative of the pedestal level of the color television signal. Accordingly, each of these comparators may comprise a differential amplifier, such as an operational amplifier, or the like, having negative and positive inputs. The negative inputs of comparators 12, 13 and 14 are coupled to the outputs of adders 9, 10 and 11, respectively; and the positive inputs of these comparators are connected in common to the source of reference signal $E_o$, shown herein as a d.c. source. The outputs of comparators 12, 13 and 14 are connected to sampling circuits 15, 16 and 17, respectively. Each of these sampling circuits includes a sampling pulse input terminal connected in common to clamp pulse generator 19. Thus, the sampling circuits are operated, or energized, in response to the occurrence of a clamp pulse $C_P$ so as to sample the outputs of comparator 12, 13 and 14, respectively. These sampled outputs are fed back to capacitors 20, 21 and 22, respectively, and are used as the aforementioned adjustment signal.

A conventional synchronizing separator circuit 18 is coupled to input terminal 1 to receive the composite color television signal $S_V$ and to separate the horizontal synchronizing pulse therefrom. The output of the synchronizing separator circuit is coupled to clamp pulse generator 19 and is adapted to actuate the clamp pulse generator to produce the clamp pulse $C_P$ at a time delayed from the time of occurrence of the horizontal synchronizing pulse. Thus, the clamp pulse $C_P$ is generated in time coincidence with the time of occurrence of the pedestal level of the composite color television signal.

In operation, the chrominance component included in the composite color television signal $S_V$ which is applied to input terminal 1 is separated from the composite color television signal by band pass amplifier 2 and is supplied to demodulators 3 and 4. It is appreciated that, in a typical color television receiver, the incoming burst signal which is included in the composite color television signal is gated therefrom and is used to synchronize the phase and frequency of a local oscillator. The output of this local oscillator is a local subcarrier $S_c$ whose frequency is equal to the frequency of the chrominance subcarrier, i.e., 3.58 MHz. This local subcarrier is applied to input terminal 5 and is supplied through phase shifters 6 and 7 to demodulators 3 and 4, respectively. Phase shifter 6 is adapted to shift the phase of the local subcarrier $S_c$ so as to be in alignment with the R-Y axis. Hence, demodulator 3 is supplied with demodulating signal $CW_{R-Y}$ for demodulating the red color difference signal $S_{R-Y}$ from the chrominance component which is supplied thereto by the band pass amplifier.

Similarly, phase shifter 7 is adapted to shift the phase of the local subcarrier $S_c$ so as to be in alignment with the B-Y axis. This phase shifter supplies a blue demodulating signal $CW_{B-Y}$ to demodulator 4 for the purpose of enabling the demodulator to demodulate the blue color difference signal $S_{B-Y}$ from the chrominance component which is applied thereto by the band pass amplifier. Accordingly, demodulators 3 and 4 produce the red and blue color difference signals $S_{R-Y}$ and $S_{B-Y}$, respectively.

Matrix 8 receives the red and blue color difference signals and combines these respective color difference signals in predetermined proportions so as to produce the green color difference signal $S_{G-Y}$. Thus, the demodulated red, green and blue color difference signals $S_{R-Y}$, $S_{G-Y}$ and $S_{B-Y}$ are applied to adders 9, 10 and 11, respectively.

Let it be assumed that, for the moment, the pedestal level of each of the color difference signals is correct and, therefore, that no adjustment signals are stored across capacitors 20, 21 and 22. Accordingly, the red color difference signal $S_{R-Y}$ is supplied through adder 9 to comparator 12. Similarly, the green color difference signal $S_{G-Y}$ is supplied through adder 10 to comparator 13. Likewise, the blue color difference signal $S_{B-Y}$ is supplied through adder 11 to comparator 14. Each of these color difference signals is compared to the reference signal level $E_o$, this reference signal level being equal to the desired pedestal level. At the time of occurrence of the pedestal level in the composite color television signal, clamp pulse $C_P$ is supplied to each sampling circuit 15, 16 and 17 by clamp pulse generator 19. Since it has been assumed that the pedestal level of each color difference signal is correct, then, at the time that the sampling circuits are energized, the color difference signal which is supplied to each comparator is at its pedestal level, which has been assumed to be equal to $E_o$. Thus, the outputs of comparators 12, 13 and 14, which are sampled by sampling circuits 15, 16 and 17, all are equal to zero, and this sampled zero level is fed back to and stored on capacitors 20, 21 and 22, respectively. Thus, no adjustment is made to the pedestal levels of the color difference signals.

Now let it be assumed that the pedestal level of a color difference signal, such as the red color difference signal $S_{R-Y}$, varies from its desired level. If it is assumed that this pedestal level increases, then the pedestal level of the red color difference signal $S_{R-Y}$ which is applied to the negative input terminal of comparator 12 exceeds the reference signal level $E_o$. Consequently, sampling circuit 15 feeds back a negative sampled signal to capacitor 20. This negative signal reduces the d.c. level, i.e., the pedestal level, of the red color difference signal $S_{R-Y}$, thereby returning this pedestal level to its desired level. As may be appreciated, if it had been assumed that the pedestal level of the red color difference signal decreases, then a positive sampled signal is fed back to capacitor 20 for increasing the pedestal level of the red color difference signal.

The remaining clamping circuits operate in a similar fashion so as to maintain, or clamp, the respective color difference signals at the desired pedestal level.

It may be appreciated that, if comparator 13, sampling circuit 16 and capacitor 21 are omitted, the complexity and expense of the clamp circuit is substantially reduced. It has been thought that this simplification can be achieved if the color difference signals $C_{R-Y}$ and $C_{B-Y}$ at the outputs of adders 9 and 11, that is, the clamped color difference signals, are matrixed to form the green color difference signal. That is, if the red and blue color difference signals are properly clamped to the correct pedestal levels, then it had been thought that the resultant green color difference signal, which is produced by matrixing these properly clamped red and blue color difference signals, also would be properly clamped to the correct pedestal level. However, contrary to this assumption, although the red and blue color difference signals may be properly clamped, the pedestal level of the green color difference signal is susceptible to fluctuations. Such fluctuations in the pedestal level are due to resistance changes and varying resistance values in the matrix which is used to derive the green color difference signal from the clamped red and blue color difference signals.

Figure 2:
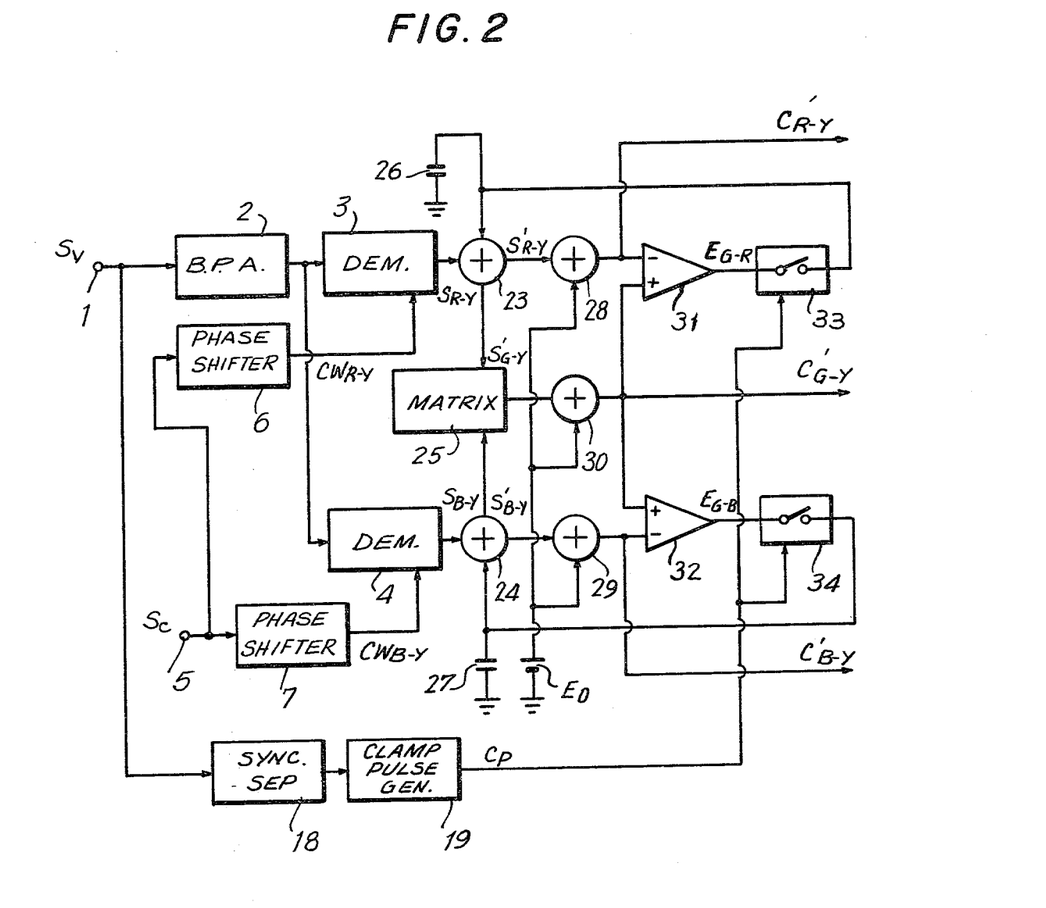
FIG. 2 is a block diagram of one embodiment of the clamp circuit in accordance with the present invention.

The foregoing difficulty in the simplified clamp circuit is overcome by the present invention, one embodiment of which is illustrated in FIG. 2. As shown, the band pass amplifier, demodulators, phase shifters, synchronizing signal separator and clamp pulse generator are substantially the same as the corresponding elements described above with respect to FIG. 1. The output of demodulator 3 is coupled to one input of adder 23, the other input of which being supplied with an adjustable control signal which is stored across capacitor 26. Adder 23 may be similar to aforedescribed adder 9. Similarly, the output of demodulator 4 is coupled to one input of an adder 24, the other input of which being coupled to receive another adjustable control signal which is stored across capacitor 27. Hence, adder 24 may be similar to aforedescribed adder 11.

Each of adders 23 and 24 is shown as having two outputs. The signals which are provided at these outputs are of substantially equal amplitude, but of opposite polarity. One output of adder 23 is coupled to a matrix circuit 25, and the other output of this adder is coupled to yet another adder 28. Similarly, one output of adder 24 is coupled to matrix circuit 25, and the other output from adder 24 is coupled to another adder 29. Let it be assumed that the outputs from adders 23 and 24 which are coupled to adders 28 and 29 are of positive polarity, and the outputs from adders 23 and 24 which are coupled to matrix circuit 25 are of negative polarity. As is known to those of ordinary skill in the television receiver art, a color matrix circuit is operable to produce the green color difference signals $S_{G-Y}$ from negative polarity red ($S_{R-Y}$) and blue ($S_{B-Y}$) color difference signals. Thus, it is proper to assume that the two outputs from adder 23 are of opposite polarities, and that the two outputs from adder 234 also are of opposite polarities. The positive polarity output from adder 23 is designated $S'_{R-Y}$ because the original red color difference signal $S_{R-Y}$ has been modified by the addition thereto of the adjustable control signal which is stored across capacitor 26. Similarly, the positive polarity output from adder 24 is designated $S'_{B-Y}$ because the original blue color difference signal $S_{B-Y}$ has been modified by the addition thereto of the adjustable control signal which is stored across capacitor 27. Consistent with this designation, and since modified negative polarity red and blue color difference signals are supplied to matrix circuit 25, the green color difference signal which is produced by this matrix is designated as $S'_{G-Y}$. That is, the green color difference signal is a modified color difference signal because the red and blue color difference signals which are matrixed together are modified color difference signals.

Adders 28 and 29 are coupled to the outputs of adders 23 and 24 to receive the modified red and blue color difference signals $S'_{R-Y}$ and $S'_{B-Y}$, respectively. Adder 30 is coupled to the output of matrix circuit 25 to receive the modified green color difference signals $S'_{G-Y}$. In addition, a reference signal $E_o$, shown as being produced by a d.c. source, is supplied to each of adders 28, 29 and 30 for addition therein to the modified red, blue and green color difference signals. In accordance with the present embodiment, it is assumed that reference signal $E_o$ represents the pedestal level of the color television signal and, preferably, is equal to the pedestal level. If desired, and depending upon the gains of the respective adders and comparators, reference signal $E_o$ may be equal to a different d.c. level, and it still is representative of the pedestal level.

Comparators 31 and 32 each are provided with negative and positive input terminals, similar to comparators 12 and 14 described above. The negative input terminal of comparator 31 is coupled to the output of adder 28, and the positive input terminal thereof is coupled to the output of adder 30. The negative input terminal of comparator 32 is coupled to the output of comparator 29, and the positive intput terminal thereof is coupled to the output of adder 30. Thus, the modified green color difference signal $S'_{G-Y}$ is compared to each of the red color difference signal $S'_{R-Y}$ and the blue color difference signal $S'_{B-Y}$. Comparator 31, which may be a difference amplifier, a subtracting circuit, or the like, is adapted to produce an output signal, designated $E_{G-R}$, which is a function of the difference between the green and red color difference signals supplied thereto. Similarly, comparator 32 is adapted to produce an output signal, designated $E_{G-B}$, which is a function of the difference between the green and blue color difference signals supplied thereto.

Sampling circuits 33 and 34, which may be similar to aforedescribed sampling circuits 15 and 17, are coupled to the output of comparators 31 and 32, respectively, and are energized by clamp pulse $C_P$ to sample the outputs from these comparators at the times of occurrence of the pedestal level in the composite color television signal. Thus, at the sampling times of sampling circuits 33 and 34, all of the color difference signals exhibit their respective pedestal levels. Any difference between the pedestal levels of the red color difference signal and the green color difference signal is sampled and fed back to capacitor 26 for use as the aforementioned control signal. Similarly, any difference between the pedestal levels of the blue color difference signal and the green color difference signal is fed back to and stored across capacitor 27 for use as the aforementioned control signal.

In operation, let it be assumed that the pedestal level of the red color difference signal $S_{R-Y}$ increases above its desired level. This means that the pedestal level of the modified red color difference signal of positive polarity $S'_{R-Y}$ also increases so as to increase the level of the signal supplied to the negative input terminal of comparator 31. At the same time, the pedestal level of the modified red color difference signal of negative polarity changes in an opposite direction. As a result thereof, the pedestal level of the modified green color difference signal $S'_{G-Y}$, which is produced by matrixing the modified red and blue color difference signals, is reduced. Thus, the level of the signal which is applied to the positive input terminal of comparator 31 likewise is reduced. Therefore, since the level of the signal which is supplied to the negative input terminal of the comparator increases and the level of the signal which is supplied to the positive input terminal thereof decreases, there is a reduction in the output signal $E_{G-R}$ produced by comparator 31. This reduced signal level is sampled by sampling circuit 33 at the time of occurrence of the pedestal level and reduces the control signal which is stored across capacitor 26. This decrease in the control signal corrects or compensates for the assumed increase in the pedestal level of the red color difference signal $S_{R-Y}$. Therefore, it is seen that the red color difference signal is returned to its proper pedestal level.

In a similar manner, a reduction in the pedestal level of the red color difference signal $S_{R-Y}$ is detected by comparator 31 as an increase in the output signal $E_{G-R}$ produced thereby. This increase signal level is sampled by sampling circuit 33 and fed back to capacitor 26 so as to increase the control signal. Hence, the pedestal level of the red color difference signal is increased by an amount which corrects, or compensates, for the assumed reduction thereof.

It may be appreciated that comparator 32, sampling circuit 34 and capacitor 27 function in a similar manner so as to correct for changes in the pedestal level of the blue color difference signal $S_{B-Y}$. Thus, the correct pedestal level for this color difference signal is maintained accordingly. That is, changes in the pedestal level of the blue color difference signal are detected by comparator 32 to produce an output signal $E_{G-B}$. This output signal from comparator 32 is sampled by sampling circuit 34 and fed back to capacitor 27 for use as a control signal to return the pedestal level of the blue color difference signal $S_{B-Y}$ to its proper level.

In the event of a change in the pedestal level of the modified green color difference signal $S'_{G-Y}$, it is seen that this change is applied equally to comparators 31 and 32. Hence, equal control signals are fed back to capacitors 26 and 27 to achieve equal modifications in the red and blue color difference signals which are matrixed together to produce the green color difference signal. Hence, the green color difference signal is returned to its proper pedestal level, and all of the color difference signals are clamped to the correct pedestal level.

The feedback control circuit which controls the pedestal level of the red color difference signal is formed of two feedback loops. One loop is comprised of adder 23, adder 28, comparator 31, sampling circuit 33 and capacitor 26. The other loop is formed of adder 23, matrix circuit 25, adder 30, comparator 31, sampling circuit 33 and capacitor 26. These two feedback loops function to clamp the pedestal level of the modified red color difference signal $S'_{R-Y}$ to a constant level. Also, these two feedback loops function to maintain the signals which are supplied to the negative and positive input terminals of comparator 31 equal to each other.

Similarly, the feedback control circuit which is used to control the pedestal level of the blue color difference signal is comprised of two negative feedback loops. One negative feedback loop is formed of adder 24, adder 29, comparator 32, sampling circuit 34 and capacitor 27. The other negative feedback loop is formed of adder 24, matrix circuit 25, adder 30, comparator 32, sampling circuit 34 and capacitor 27. Here too, these two negative feedback loops function to maintain the pedestal level of the modified blue color difference signal $S'_{B-Y}$ constant, and also maintain the signals which are supplied to the negative and positive input terminals of comparator 32 equal to each other.

Since the modified red and blue color difference signals are clamped to a constant pedestal level, fluctuations in one do not disturb the other. That is, fluctuations in the pedestal level of the blue color difference signal are outside of the two negative feedback loops which control the pedestal level of the red color difference signal. Likewise, fluctuations in the pedestal level of the red color difference signal are outside the two negative feedback loops which control the pedestal level of the blue color difference signal.

A change in, for example, the pedestal level of the blue color difference signal, may appear as a change in the pedestal level of the green color difference signal. This, in turn, results in compensating changes in the pedestal levels of the red and blue color difference signals. Since this change in the pedestal level of the blue color difference signal is corrected, the red color difference signal remains clamped to its substantially constant and proper pedestal level. A similar occurrence obtains if there is a change in the pedestal level of the red color difference signal.

Thus, it is seen that the modified red color difference signal $S'_{R-Y}$ provided at the output of adder 23, the modified blue color difference signal $S'_{B-Y}$ provided at the output of adder 24, and the modified green color difference signal $S'_{G-Y}$ provided at the output of matrix circuit 25, all are clamped to constant pedestal level. This clamped level can be selected to be any desired pedestal level by the addition of reference signal $E_o$ to the modified color difference signal. For this reason, the outputs of adders 28, 29 and 30 are selected as the output terminals of the illustrated clamp circuit from which the properly clamped red color difference signal $C'_{R-Y}$, blue color difference signal $C'_{B-Y}$ and green color difference signal $C'_{G-Y}$ are obtained. Depending upon the respective gains and/or attenuations of the illustrated elements, reference signal $E_o$ may exhibit any desired value from which the correct pedestal level is obtained.

Figure 3:
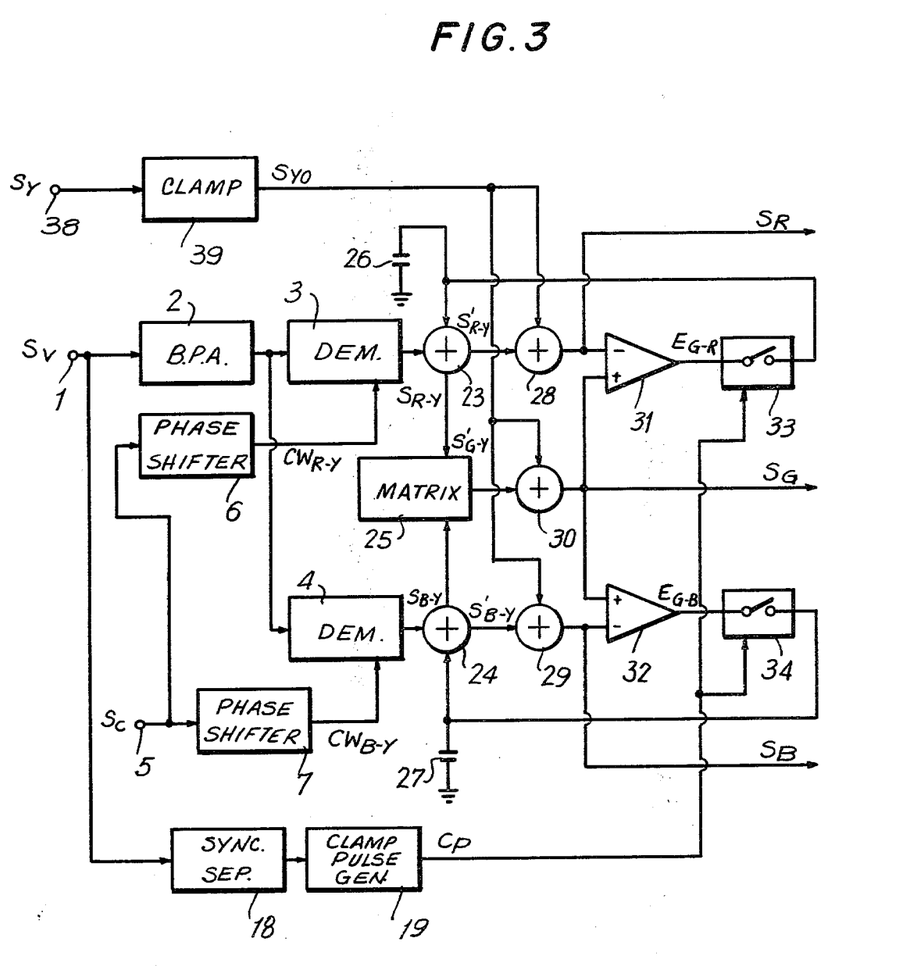
FIG. 3 is a block diagram of another embodiment of the clamp circuit in accordance with the present invention.

Turning now to another embodiment of the present invention, reference is made to the block diagram illustrated in FIG. 3. It is seen that this embodiment is substantially similar to the aforedescribed embodiment shown in FIG. 2, except that in the FIG. 3 embodiment, reference signal $E_o$ is not supplied to each of adders 28, 29 and 30. Rather, the reference signal which is supplied to these adders is designated as $S_{YO}$. This reference signal is equal to the luminance component of the composite color television signal clamped to the proper pedestal level. This clamped luminance signal is produced by a clamping circuit 39 which is coupled to an input terminal 38 for receiving the luminance component $S_Y$ separated from the composite color television signal. Clamping circuit 39 may be similar to any of the color difference clamping circuits shown in FIG. 1. Thus, the luminance component $S_Y$ is compared to a pedestal level, and any difference therebetween is sampled at the time of occurrence of the pedestal level to produce an adjusting signal. This adjusting signal is fed back to modify the luminance component. The modified luminance component thus is clamped to the proper pedestal level, and appears as the clamped luminance signal $S_{YO}$.

It is advantageous to use the clamped luminance signal $S_{YO}$ as the reference signal because, during a sampling operation, a correct representation of the pedestal level of the color television signal is produced and, moreover, during the video information portion of the television signal, the respective red, blue and green color drive signals $S_R$, $S_B$ and $S_G$ are produced directly. With respect to the clamping operation, it is seen that the clamped luminance signal $S_{YO}$ is equal to the pedestal level at the time of occurrence of the clamp pulse $C_P$, that is, at the time of occurrence of the pedestal level of the composite color television signal. Thus, in adder 28, the modified red color difference signal $S'_{R-Y}$ has the desired pedestal level added thereto. Similarly, in adder 29, the modified blue color difference signal $S'_{B-Y}$ has the proper pedestal level added thereto. Likewise, in adder 30, the modified green color difference signal $S'_{G-Y}$ has the proper pedestal level added thereto. Comparators 31 and 32, sampling circuits 33 and 34, and capacitors 26 and 27 function in the manner described hereinabove to maintain the red, blue and green color difference signals clamped to the proper, constant pedestal level.

During the information portion of each line of video signals, it is seen that the respective red, blue and green color difference signals represent red, blue and green video information, and these signals are clamped to the proper pedestal level. At the same time, the clamped luminance signal $S_{YO}$ represent luminance information. As is known, red, blue and green color drive signals are obtained by adding the luminance signal to each of the color difference signals. Thus, when the red color difference signal is added to the luminance signal, the result is the red drive signal $S_R$. Similarly, when the blue color difference signal is added to the luminance signal, the result is the blue drive signal $S_B$. Finally, when the green color difference signal is added to the luminance signal, the result is the green drive signal $S_G$. During the video information portion of each line interval, adder 28 adds the clamped luminance signal $S_{YO}$ to the clamped modified red color difference signal $S'_{R-Y}$ to produce a properly clamped red drive signal $S_R$. At this same time, adder 29 serves to add the clamped luminance signal $S_{YO}$ to the clamped modified blue color difference signal $S'_{B-Y}$ to produce a properly clamped blue drive signal $S_B$. Similarly, and at the same time, adder 30 serves to add the clamped luminance signal $S_{YO}$ to the clamped modified green color difference signal $S'_{G-Y}$ to produce a properly clamped green drive signal $S_G$.

Thus, it is appreciated that, during a clamping operation, that is, during the interval that the pedestal level of the composite color television signal is present, adders 28, 29 and 30 add a reference signal, which is substantially equal to the pedestal level, to the modified color difference signals, as in the embodiment shown in FIG. 2. However, during the information portion of each line of video signals, these same adders add the clamped luminance component to the clamped color difference signals so as to produce clamped color drive signals. This obviates the need for additional combining circuitry, such as an additional matrix circuit, for producing the color drive signals from the clamped color difference signals. If desired, adders 28, 29 and 30, shown in FIG. 3, may comprise the conventional red, blue and green matrix circuits of a color television receiver.

Figure 4:
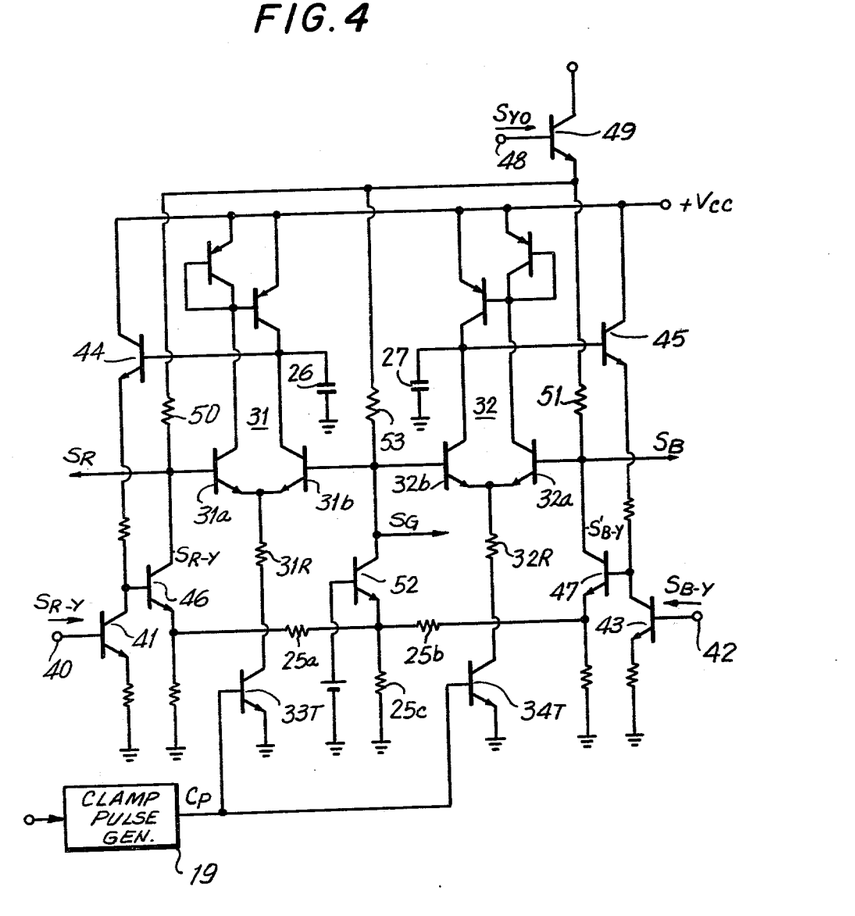
FIG. 4 is a schematic diagram of the clamp circuit shown in FIG. 3.

Turning now to FIG. 4, there is illustrated a schematic diagram of the clamp circuit shown in FIG. 3. Adder 23 includes transistors 41 and 44; and adder 24 includes transistors 43 and 45. The base electrode of transistor 44 is coupled to an input terminal 40 to receive the demodulated red color difference signal $S_{R-Y}$ produced by demodulator 3. The base electrode of transistor 43 is coupled to an input terminal 40 to receive the demodulated blue color difference signal $S_{B-Y}$ produced by demodulator 4. The base electrode of transistor 44 is coupled to capacitor 26 for receiving the control signal fed back thereto by sampling circuit 33, to be described. The emitter of transistor 44 is coupled to the collector of transistor 41 by a resistor so as to add the respective signals which are supplied thereto. It is seen that transistor 41 operates as a phase inverter, whereby the signal which appears at its collector is of opposite polarity to the signal which is supplied to its base. Transistor 44 is connected as an emitter-follower and, therefore, the signal which is supplied to its emitter is of the same polarity as the signal which is supplied to its base. Transistors 43 and 45 are connected in a similar fashion as transistors 41 and 44. Hence, the signal which is provided across capacitor 27 is supplied to the base of transistor 45 and appears at its emitter so as to be added to the signal which is provided at the collector of transistor 43.

Transistor 46 has its base connected to the collector of transistor 41 and functions as a phase splitter. That is, the signal which is provided at the collector of transistor 46 is of inverted polarity with respect to the signal which is provided at its base, while the signal which is provided at the emitter of this transistor is of the same polarity as the signal which is provided at its base. Transistor 47 is connected to the collector of transistor 43 in a similar manner, and thus functions as a phase splitter.

An emitter-follower transistor 49 has its base coupled to an input terminal 48 to receive the clamped luminance signal $S_{YO}$. The emitter of this emitter-follower is coupled to resistors 50, 51 and 53, these resistors functioning in combination with transistors 46, 47 and 52 as adders 28, 29 and 30, respectively.

Transistor 52 is connected as a common-base transistor whose emitter is connected to ground by an emitter resistor 25c. Resistor 25a connects the emitter of transistor 56 to the emitter of transistor 52; and resistor 25b connects the emitter of transistor 47 to the emitter of transistor 52. Resistors 25a, 25b and 25c function as matrix circuit 25 for combining the modified red and blue color difference signals to produce the modified green color difference signal at the emitter of transistor 52.

Comparator 31 is shown as a differential amplifier formed of resistors 31a and 31b whose emitters are connected in common through resistor 31R to ground through a switching transistor 33T. The base of transistor 31a corresponds to the negative input terminal of this differential amplifier and is coupled to the collector of transistor 46 for receiving the modified red color difference signal $S'_{R-Y}$ with the clamped luminance signal $S_{YO}$ added thereto. The base of transistor 31b corresponds to the positive input terminal of differential amplifier 31 and is coupled to the collector of transistor 52 to receive the modified green color difference signal $S'_{G-Y}$ with the clamped luminance component $S_{YO}$ added thereto. The collector of transistor 31b is connected to capacitor 26.

Comparator 32 is constructed as a differential amplifier formed of transistors 32a and 32b whose emitter electrodes are connected in common through a resistor 32R to ground by a switching transistor 34T. The base of transistor 32a corresponds to the negative input terminal of this differential amplifier and is coupled to the collector of transistor 47 to receive the modified blue color different signal $S'_{B-Y}$ with the clamped luminance signal $S_{YO}$ added thereto. The base of transistor 32b corresponds to the positive input terminal of differential amplifier 32 and is coupled to the collector of transistor 52 in common with the base of transistor 31b. The collector of transistor 32b is connected to capacitor 27.

The bases of transistors 33T and 34T are connected in common to clamp pulse generator 19 to receive the clamp pulse $C_P$.

The operation of the embodiment shown in FIG. 4, which is a schematic diagram of the embodiment shown in FIG. 3, now will be described. Color difference signal $S_{R-Y}$ is supplied to transistor 41 and, after being phase-inverted, is combined at the collector of this transistor with the control signal which is stored across capacitor 26 and supplied to the collector of transistor 41 by emitter-follower 44. Thus, it may be considered that the modified color difference signal, of inverted polarity, is supplied to the base of transistor 46.

Similarly, the blue color difference signal $S_{B-Y}$ is supplied to transistor 43 and, after being inverted thereby, is combined at the collector of this transistor with the control signal stored across capacitor 27, this control signal being supplied to the collector of transistor 43 by emitter-follower 45. Hence, it may be considered that the modified blue color difference signal, of inverted polarity, is supplied to transistor 47.

The phase-inverted (i.e., negative-polarity) modified red and blue color difference signals which are supplied to the bases of transistors 46 and 47 appear at the respective emitters thereof. These phase-inverted color difference signals are combined by resistors 25a and 25b to produce the modified green color difference signal $S'_{G-Y}$ across resistor 25c. In addition, transistors 46 and 47 phase-invert the signals which are supplied to their respective bases, whereby a modified red color difference signal $S'_{R-Y}$ of positive polarity is provided at the collector of transistor 46, and a modified blue color difference signal $S'_{B-Y}$ of positive polarity is provided at the collector of transistor 47. Since transistor 52 operates in its common base mode, the collector of this transistor is provided with the modified green color difference signal.

The clamped luminance signal $S_{YO}$ is supplied to each of resistors 50, 51 and 53 by emitter-follower 49. Resistor 50 serves to add the modified red color difference signal $S'_{R-Y}$ to the clamped luminance signal $S_{YO}$ so as to produce the red drive signal $S_R$. This red drive signal is derived from the collector of transistor 46. If desired, a resistor may be provided in the collector circuit of this transistor. Similarly, resistor 51 adds the modified blue color difference signal $S'_{B-Y}$ and the clamped luminance signal $S_{YO}$ to produce the blue drive signal $S_B$. This blue drive signal is derived from the collector of transistor 47. If desired, a collector resistor may be connected to this transistor. Likewise, resistor 53 adds the modified green color difference signal $S'_{G-Y}$ and the clamped luminance signal $S_{YO}$ to produce the green drive signal $S_G$. This green drive signal is obtained from the collector of transistor 52. If desired, a collector resistor may be connected to this transistor.

Differential amplifier 31 compares the red drive signal $S_R$ to the green drive signal $S_G$. Similarly, differential amplifier 32 compares the blue drive signal $S_B$ to the green drive signal. These comparisons are performed only when current flows through resistors 31R and 32R. This, in turn, obtains when transistors 33T and 34T are rendered conductive. Thus, at the time of occurrence of the pedestal level of the color television signal, clamp pulse $C_P$ renders transistors 33T and 34T conductive so that the red and green drive signals are compared to each other, and so that the blue and green drive signals also are compared to each other. Any difference between the red and green drive signals is due to a change in the pedestal level, and this difference is stored across capacitor 26. Similarly, any difference between the green and blue drive signals is due to a change in the pedestal level, and this difference is stored across capacitor 27. These stored differences are fed back as control signals to the collectors of transistors 41 and 43, respectively, to modify the pedestal, or d.c. level, of the demodulated red and blue color difference signals.

Thus, it is seen that if the pedestal level of the demodulated red color difference signal changes, then at the time that clamp pulse $C_P$ renders transistors 33T and 34T conductive so that differential amplifiers 31 and 32 are operative, the level of the signal which is applied to the base of transistor 31a changes in one direction while the level of the signal which is applied to the base of transistor 31b changes in the opposite direction. Consequently, the control signal which is stored across capacitor 26 is modified, and this modified control signal is fed back and added to the red color difference signal so as to compensate, or correct, for the aforementioned change in level. A similar operation is performed in the event of a change in the pedestal level of the blue color difference signal. Similarly, if the pedestal level of the green color difference signal, which is produced by the resistor matrix formed of resistors 25a, 25b and 25c, changes, then the level of the signal which is supplied to the bases of transistors 31b and 32b changes. At the time that differential amplifiers 31 and 32 are operative in response to clamp pulse $C_P$, the control signals stored across capacitors 26 and 27 are changed so as to correspondingly change the level of the signals which are applied to transistors 31a and 32a by transistors 46 and 47, respectively. These feedback loops thus have the effect of compensating for changes in the pedestal level of the respective color drive signals $S_R$, $S_B$ and $S_G$.

It is seen that the operation of the embodiment shown schematically in FIG. 4, and shown as a block diagram in FIG. 3, is similar to the operation of the embodiment shown in FIG. 2. In the FIG. 2 embodiment, the feedback loops compensate for changes in the pedestal levels of the color difference signals and, therefore, clamp these color difference signals to the proper pedestal level. In the embodiment of FIGS. 3 and 4, the feedback loops function to correct for changes in the pedestal level of the color drive signals so as to clamp these color drive signals to the proper pedestal level. The primary difference between these embodiments is the use of a d.c. level $E_o$ as the reference signal (FIG. 2) or the use of the clamped luminance signal $S_{YO}$ as the reference signal (FIGS. 3 and 4). It may be appreciated that a schematic representation of the block diagram shown in FIG. 2 will be similar to the schematic diagram of FIG. 4.

In both embodiments, it is seen that all of the color difference signals, or all of the color drive signals, are clamped to the same pedestal level. The embodiment of FIGS. 3 and 4 has the additional advantage that portions of the clamp circuit are used to produce the color drive signals directly. This is because, in the embodiment of FIGS. 3 and 4, the reference signal which represents the pedestal level of the color television signal is equal to the pedestal level of the luminance signal.

While the present invention has been particularly shown and described with reference to preferred embodiments, it will be readily apparent to those of ordinary skill in the art that various changes and modifications in form and details may be made without departing from the spirit and scope of the invention. For example, the various elements which are shown schematically in FIG. 4 may be formed of, for example, MOS fabrication, or other equivalent semiconductor devices. Also, the adders which are shown throughout may be replaced by other combining circuits which perform similar functions. In some instances, subtracting circuits may be used. Therefore, it is intended that the appended claims be interpreted as including these as well as other such changes and modifications.

What is claimed is:

1. A clamping circuit for color television signals, comprising:
    demodulating means for receiving chrominance signals and for demodulating said chrominance signals to produce first and second color difference signals;
    first adding means coupled to said demodulating means for adding an adjustable first control signal to said first color difference signal to produce a modified first color difference signal;
    second adding means coupled to said demodulating means for adding an adjustable second control signal to said second color difference signal to produce a modified second color difference signal;
    matrix means coupled to said first and second adding means and responsive to the outputs therefrom to produce a third color difference signal;
    means for supplying a reference signal representing a predetermined level of a color television signal;
    third adding means coupled to said first adding means for adding said reference signal to said modified first color difference signal;
    fourth adding means coupled to said second adding means for adding said reference signal to said modified second color difference signal;
    fifth adding means coupled to said matrix means for adding said reference signal to said third color difference signal;
    first comparator means coupled to said third and fifth adding means for comparing the outputs from said third and fifth adding means to produce a first output signal as a function of the difference therebetween;
    second comparator means coupled to said fourth and fifth adding means for comparing the outputs from said fourth and fifth adding means to produce a second output signal as a function of the difference therebetween;
    first sampling means for sampling said first output signal at predetermined times corresponding to the times of occurrence of said predetermined level of said color television signal to produce said first control signal; and
    second sampling means for sampling said second output signal at said predetermined times to produce said second control signal.

2. The circuit of claim 1 wherein said reference signal is a d.c. level proportional to the pedestal level of said color television signal.

3. The circuit of claim 1 wherein said means for supplying a reference signal comprises clamp means for receiving the luminance signal of said color television signal to produce a luminance signal clamped to the pedestal level of said color television signal.

4. The circuit of claim 1 further comprising pulse generating means for generating periodic pulses which are coincident with the times of occurrence of the pedestal level of said color television signal; and wherein each of said first and second sampling means comprises a switching circuit coupled to the output of a respective comparator means, and a storage circuit coupled to the output of said switching circuit, said switching circuit being responsive to a pulse for connecting the output of said respective comparator means to said storage circuit.

5. The circuit of claim 1 wherein said first color difference signal is the red difference signal R-Y, said second color difference signal is the blue difference signal B-Y, and said third color difference signal is the green difference signal G-Y; wherein said reference signal represents the pedestal level of said color television signal at least at said predetermined times; and further comprising red, blue and green output terminals coupled to said third, fourth and fifth adding means, respectively, to derive clamped color signals thereat.

6. The circuit of claim 5 wherein said reference signal comprises the luminance signal of said color television signal clamped to said pedestal level, said reference signal being equal to said pedestal level at said predetermined times, said luminance signal being added to said red, blue and green difference signals, respectively, in said third, fourth and fifth adding means to derive clamped red, blue and green color signals at said red, blue and green output terminals, respectively.

7. The circuit of claim 5 further comprising means for inverting the polarities of the outputs from said first and second adding means supplied to said matrix means relative to the polarities of the outputs from said first and second adding means supplied to said third and fourth adding means; and wherein each of said comparator means comprises difference means having a positive input terminal coupled to receive the output from said fifth adding means and a negative input terminal coupled to receive the output from a respective one of said third or fourth adding means, such that a change in the pedestal level of a respective one of said red or blue color difference signals results in an opposite change in the pedestal level of said green color difference signal to produce a change in the output of said difference means so as to correspondingly change a respective one of said first or second control signals, thereby cancelling said change in said pedestal level.

* * * * *